United States Patent
Takeda et al.

(10) Patent No.: US 10,128,919 B2
(45) Date of Patent: Nov. 13, 2018

(54) USER TERMINAL, RADIO BASE STATION, RADIO COMMUNICATION SYSTEM, AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/524,700

(22) PCT Filed: Oct. 9, 2015

(86) PCT No.: PCT/JP2015/078743
§ 371 (c)(1),
(2) Date: May 5, 2017

(87) PCT Pub. No.: WO2016/072217
PCT Pub. Date: May 12, 2016

(65) Prior Publication Data
US 2017/0324452 A1 Nov. 9, 2017

(30) Foreign Application Priority Data
Nov. 6, 2014 (JP) ................. 2014-226504

(51) Int. Cl.
*H04L 1/02* (2006.01)
*H04B 7/0404* (2017.01)
(Continued)

(52) U.S. Cl.
CPC ........... *H04B 7/0404* (2013.01); *H04L 5/001* (2013.01); *H04L 27/2601* (2013.01); *H04L 5/0037* (2013.01); *H04L 27/2662* (2013.01)

(58) Field of Classification Search
CPC ..... H04L 1/0618; H04L 1/06; H04L 27/2647; H04L 27/2657; H04L 5/0055;
(Continued)

(56) References Cited

U.S. PATENT DOCUMENTS 9,191,171 B2    11/2015 Nakao et al.
2014/0194126 A1*  7/2014 Tsuboi .............. H04W 36/0072
                                                          455/437
(Continued)

FOREIGN PATENT DOCUMENTS

EP    2451111 A2      5/2012
EP    2451111 A3      5/2013
WO    2011/125320 A1  10/2011

OTHER PUBLICATIONS

Office Action issued in corresponding Japanese Patent Application No. 2016-557518, dated Sep. 19, 2017 (11 pages).
(Continued)

*Primary Examiner* — Khai Tran
(74) *Attorney, Agent, or Firm* — Osha Liang LLP

(57) ABSTRACT

An object is to enable proper operation of extended carrier aggregation that can allocate at least six component carriers to each user terminal. Provided is a user terminal that communicates with a radio base station that configures a plurality of cell groups each of which including one or more cells. The user terminal includes: a control unit that controls six or more component carriers configured by the radio base station; and a transmitting/receiving unit that receives information on a plurality of component carriers configured by the radio base station and feedbacks ACK/NACK information to one of the component carriers in each cell group.

6 Claims, 16 Drawing Sheets

(51) Int. Cl.
*H04L 5/00* (2006.01)
*H04L 27/26* (2006.01)

(58) Field of Classification Search
CPC ...... H04L 5/001; H04W 24/10; H04B 7/0626; H04B 7/0404
USPC ......... 375/267, 260; 370/329, 330, 336, 342
See application file for complete search history.

(56) References Cited

U.S. PATENT DOCUMENTS

2015/0341156 A1* 11/2015 Yang .................... H04W 52/146
370/280
2017/0141904 A1* 5/2017 Ahn ...................... H04L 5/0055

OTHER PUBLICATIONS

New Postcom, "HARQ-ACK bundling considerations for uplink control signalling enhancement", 3GPP TSG RAN WG1 Meeting #70, R1-123357, Qingdao, China, Aug. 13-17, 2012 (5 pages).
International Search Report issued in PCT/JP2015/078743 dated Dec. 22, 2015 (2 pages).
Written Opinion of the International Searching Authority issued in PCT/JP2015/078743 dated Dec. 22, 2015 (4 pages).
Nokia Corporation, Nokia Networks; "New SI proposal: LTE Carrier Aggregation Enhancement Beyond 5 Carriers"; 3GPP TSG RAN Meeting #65, RP-141418; Edinburgh, UK; Sep. 9-12, 2014 (6 pages).
Samsung; "HARQ-ACK overhead reduction by partial bundling"; 3GPP TSG RAN WG1 #63, R1-106011; Jacksonville, USA; Nov. 15-19, 2010 (8 pages).
Nokia, Nokia Siemens Networks; "UL ACK/NAK Feedback for Power-Limited UE in LTE-A TDD"; 3GPP TSG RAN WG1 Meeting #61bis, R1-103788; Dresden, Germany; Jun. 28-Jul. 2, 2010 (5 pages).
Huawei, HiSilicon; "Remaining details for TDD-FDD CA"; 3GPP TSG RAN WG1 Meeting #76, R1-140031 Prague, Czech Republic; Feb. 10-14, 2014 (7 pages).
NTT Docomo, Inc.; "RRM requirement for Dual Connectivity"; 3GPP TSG-RAN WG4 #71 AH, R4-71AH-0069; Beijing, China; Jun. 24-26, 2014 (2 pages).
NVIDIA; "DRS RRM and Small Cell on/off Procedures Considerations"; 3GPP TSG-RAN WG2 #87, R2-143668; Dresden, Germany; Aug. 18-22, 2014 (6 pages).
Ericsson; "Power control for Dual Connectivity"; 3GPP TSG-RAN WG2 #87, Tdoc R2-143313; Dresden, Germany; Aug. 18-22, 2014 (2 pages).
Alcatel-Lucent Shanghai Bell, Alcatel-Lucent; "Discussion on PHR transmission for power limited scenario"; 3GPP TSG RAN WG2 Meeting #87bis, R2-144510; Shanghai, China; Oct. 6-10, 2014 (2 pages).
3GPP TS 36.300 V8.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2008 (126 pages).
Extended European Search Report issued in the counterpart European Patent Application No. 15857743.7, dated May 17, 2018 (12 pages).

* cited by examiner

USER TERMINAL, RADIO BASE STATION, RADIO COMMUNICATION SYSTEM, AND RADIO COMMUNICATION METHOD

TECHNICAL FIELD

The present invention relates to a user terminal, a radio base station, a radio communication system, and a radio communication method for a next-generation mobile communication system.

BACKGROUND ART

For the universal mobile telecommunication system (UMTS) network, the long term evolution (LTE) has been specified for further enhanced data rates and less delay (see Non-Patent Literature 1). The LTE advanced has been specified for achieving even wider bands and higher speed than those of LTE, and the succeeding systems of LTE, such as future radio access (FRA), are under study.

The system band LTE Rel.10/11 includes at least one component carrier (CC) that uses an LTE system band as one unit. Band expansion through the aggregation of multiple component carriers is referred to as carrier aggregation (CA).

For LTE Rel.12, which is a more recent LTE system, various scenarios are under study to use a plurality of cells in different frequency bands (carriers). When essentially identical radio base stations are used for a plurality of cells, aforementioned carrier aggregation can be used. When completely different radio base stations are used for a plurality of cells, dual connectivity (DC) can be used.

LTE Rel.8 to Rel.12 have been specified assuming the exclusive use of frequency bands given to providers, i.e., licensed bands. For licensed bands, 800 MHz, 2 GHz, and 1.7 GHz, for example, are used.

LTE Rel.13 or later also target the use of frequency bands that do not require licenses, i.e., unlicensed bands. Unlicensed bands include 2.4 GHz and 5 GHz, which are the same bands as Wi-Fi. LTE Rel.13 aims at carrier aggregation of licensed bands and unlicensed bands (license-assisted access (LAA)) and will possibly aim at dual connectivity and stand-alone unlicensed bands in future.

CITATION LIST

Non Patent Literature

Non Patent Literature 1
3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Carrier aggregation according to LTE Rel.10/11/12 limits the maximum number of component carriers that can be allocated to each user terminal to five. LTE Rel.13 or later can allocate at least six component carriers to each user terminal in order to achieve more flexible and higher-speed wireless communication and is studying use of extended carrier aggregation of these component carriers.

However, extension of PUCCHs and change of the MAC system would be required to achieve extended carrier aggregation that can allocate at least six component carriers to each user terminal.

An object of the present invention, which has been made to solve this problem, is to provide a user terminal, a radio base station, a radio communication system, and a radio communication method that enable proper operation of extended carrier aggregation that can allocate at least six component carriers to each user terminal.

Solution to Problem

A user terminal of the present invention communicates with a radio base station that configures a plurality of cell groups each of which including one or more cells. The user terminal includes: a control unit that controls six or more component carriers configured by the radio base station; and a transmitting/receiving unit that receives information on a plurality of component carriers configured by the radio base station and feedbacks ACK/NACK information to one of the component carriers in each cell group.

Advantageous Effect of Invention

The present invention enables proper operation of extended carrier aggregation that can allocate at least six component carriers to each user terminal.

DESCRIPTION OF EMBODIMENTS

Embodiments of the present invention will now be described with reference to the drawings.

Figure 1A:
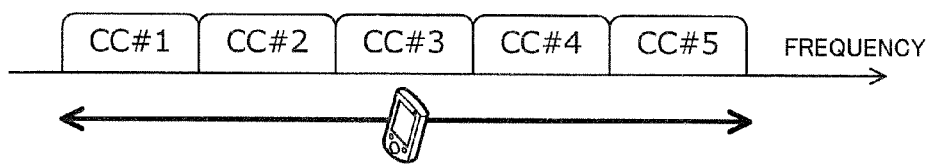
FIG. 1 is a diagram for explaining conventional carrier aggregation.

LTE Rel.10 has employed carrier aggregation of up to five component carriers to widen the band, achieving a higher data rate (see FIG. 1A).

Figure 1B:
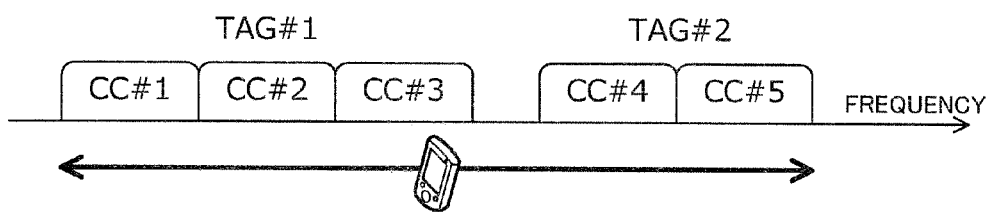

LTE Rel.11 has employed multiple timing advance (MTA) in which component carriers under inter-band carrier aggregation can be independently controlled in different timings, achieving optimization of carrier aggregation of non-co-located component carriers (see FIG. 1B).

Carrier aggregation using multiple timing advance supports timing advance groups (TAGs) classified according to their transmission timings. Referring to FIG. 1B, CC #1 to CC #3 are grouped into TAG #1, and CC #4 and CC #5 are grouped into TAG #2. Transmission timing control based on timing advance values is independently performed TAG by TAG. Accordingly, in carrier aggregation using multiple timing advances, a user terminal adjusts transmission timings for component carriers in each multiple timing advance group, so that the times when the radio base station receives uplink signals from the user terminal can be synchronized. For instance, it is possible to individually control the timings of transmission of uplink signals from the user terminal through CC #1 to CC #3 formed by the radio base station and through CC #4 and CC #5 formed by the remote radio head (RRH) connected to the radio base station.

Figure 1C:
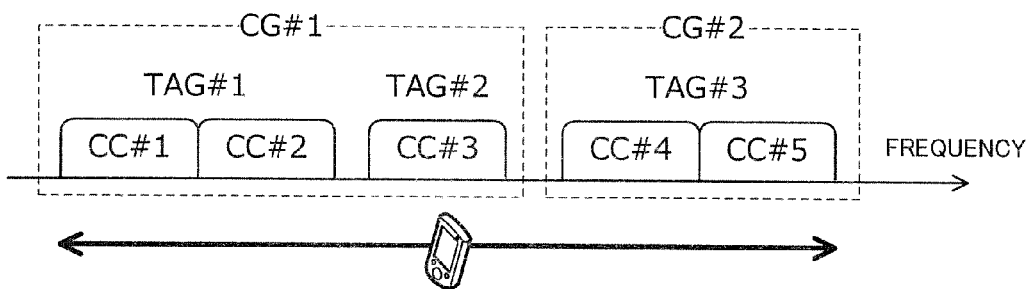

LTE Rel.12 has employed dual connectivity that aggregates cell groups (CGs) provided by a plurality of radio base stations connected through non-ideal backhaul which cannot neglect delays, achieving more flexible arrangement (see FIG. 1C).

Dual connectivity assumes that scheduling is performed for the individual schedulers of the plurality of radio base stations. Each user terminal is given a plurality of cell groups (CGs) by a radio base station, and scheduling and HARQ control are performed separately for the individual cell groups. This enables carrier aggregation of component carriers in cell groups formed by radio base stations, which are placed in different positions and perform scheduling independently. Note that dual connectivity supports multiple timing advance in the given cell group.

Referring to FIG. 1C, CC #1 to CC #3 are grouped into Cell group #1, and CC #4 and CC #5 are grouped into Cell group #2. In Cell group #1, CC #1 and CC #2 are grouped into TAG #1, and CC #3 is grouped into TAG #2. In cell group #3, CC #4 and CC #5 are grouped into TAG #3. Accordingly, with dual connectivity and carrier aggregation using multiple timing advance, independent schedulers control signals transmitted through CC #1 to CC #3 formed by the first radio base station and the RRH connected thereto and signals transmitted through CC #4 and CC #5 formed by the second radio base station, for example. Further, for each cell group, transmission timings for component carriers in different timing advance groups are adjusted by coordination between the schedulers in the radio base stations, so that the times when the radio base station receives uplink signals from the user terminal can be synchronized.

However, as shown in FIGS. 1A to 1C, LTE Rel.12 or earlier limits the maximum number of component carriers that can be allocate (configured) to each user terminal to five.

Figure 2:
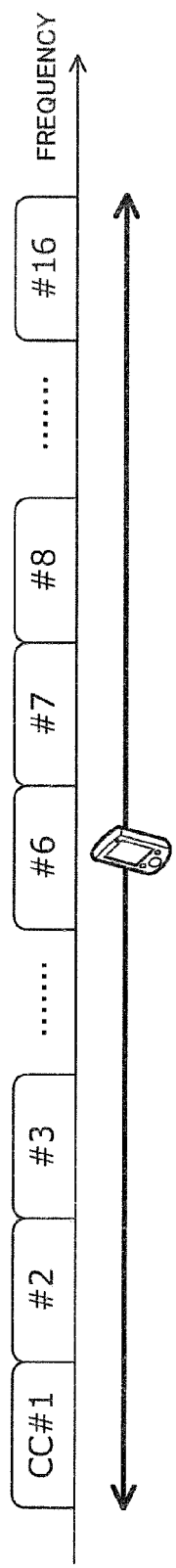
FIG. 2 is a diagram for explaining extended carrier aggregation.

In contrast, LTE Rel.13 aims at extended carrier aggregation (CA enhancement) without limiting the number of component carriers that can be allocated to each user terminal. For example, as shown in FIG. 2, extended carrier aggregation aims at aggregation of 16 component carriers. Such extended carrier aggregation achieves more flexible and higher-speed wireless communication. Thus, such extended carrier aggregation can aggregate a large number of component carriers of continuous ultra-wide bands.

Such extended carrier aggregation has a problem in that it requires a larger size of overhead for feedback data required in an uplink control channel. Examples of control data fed back through uplink control channels include hybrid automatic repeat request-acknowledge (HARQ-ACK) and channel quality indicator (CQI). However, since conventional carrier aggregation assumes up to five component carriers, HARQ-ACK of only up to five component carriers can be multiplexed with a format of an existing physical uplink control channel (PUCCH). Similarly, as for CQI feedback, CQI of only a single component carrier can be transmitted through a PUCCH.

Besides, such extended carrier aggregation has another problem in that it complicates user terminal control related to downlinks. In existing carrier aggregation, physical downlink control channels (PDCCHs), physical downlink shared channels (PDSCHs), or physical uplink shared channels (PUSCHs) are independently processed for each component carrier. For this reason, as the number of component carriers increases, more channels (several times the number of component carries) need to be controlled.

As described above, extended carrier aggregation requires PUCCH extension and change of the medium access control (MAC) system.

To solve this problem, the present inventors found a configuration for achieving extended carrier aggregation without requiring PUCCH extension and change of the MAC control system and limiting the number of component carriers that can be allocated to each user terminal.

First Embodiment

In the first embodiment, extended carrier aggregation uses Dual-PUCCHs defined by existing dual connectivity.

With dual connectivity, a PUCCH is allocated to one of the component carriers in each cell group. Thus, uplink control information (UCI) feedback is performed for each cell group separately. A component carrier given a PUCCH is a primary cell (PCell), for example.

Figure 3:
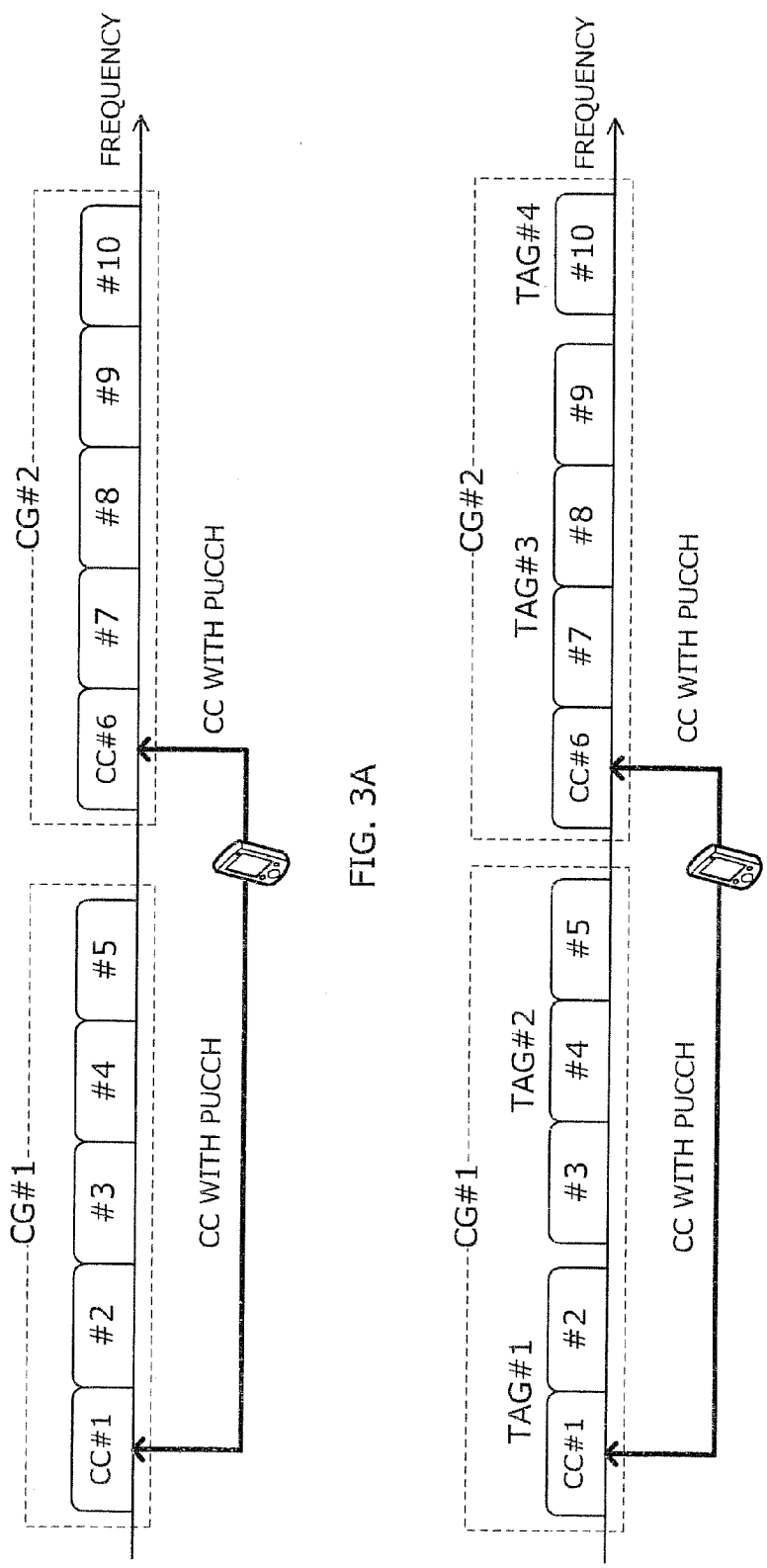
FIG. 3 is a diagram for explaining an example of extended carrier aggregation according to the first embodiment.

Accordingly, a combination of dual connectivity and conventional carrier aggregation that can aggregate up to five component carriers achieves extended carrier aggregation that can support up to 10 component carriers (see FIG. 3A).

In FIG. 3A showing Cell group #1 including 5 CC of Component carriers #1 to #5, and Cell group #2 including 5 CC of Component carriers #6 to #10, Component carriers #1 and #6 are each given a PUCCH. The user terminal performs UCI feedback using the mechanism of existing LTE with up to five component carriers in each cell group.

MTA, i.e., TA groups (TAGs) may be allocated to each cell group (see FIG. 3B).

Figure 4:
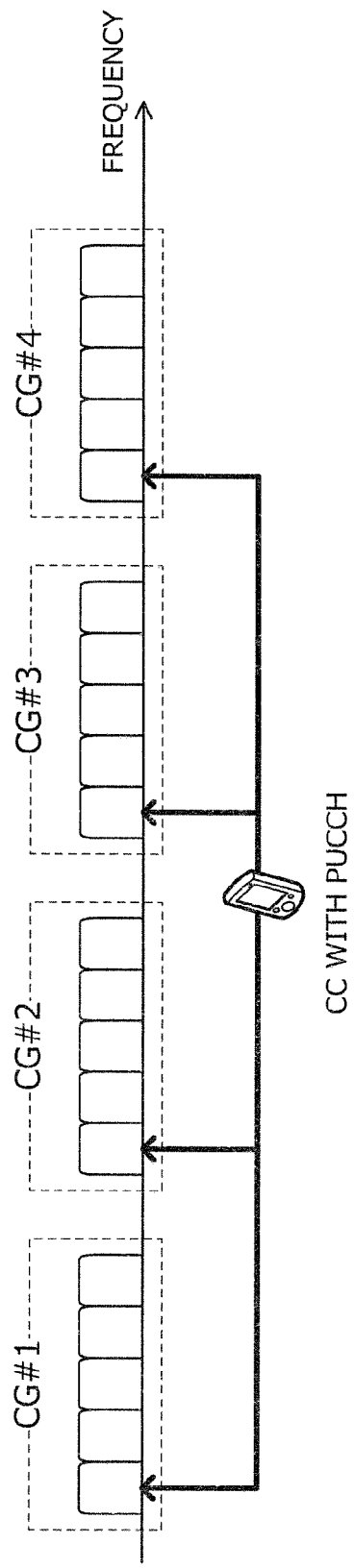
FIG. 4 is a diagram for explaining an example of extended carrier aggregation according to the first embodiment.

Increasing the number of component carriers to be given a PUCCH by one from five achieves extended carrier aggregation that can support up to 15 or 20 component carriers, for example (see FIG. 4). To be specific, a combination of conventional carrier aggregation and dual connectivity can increase the maximum number of component carriers that can be supported by extended carrier aggregation.

In the case shown in FIG. 4, extended carrier aggregation is performed for Cell groups #1 to #4. Each cell group includes up to five component carriers. To be specific, this extended carrier aggregation supports 20 component carriers. A PUCCH is allocated to one of the component carriers in each cell group. The user terminal performs UCI feedback using the mechanism of existing LTE with up to five component carriers in each cell group.

In the case shown in FIG. 4, dual connectivity may be applied to two or more cell groups.

A user terminal may report band combinations that the user terminal supports for downlink carrier aggregation and uplink carrier aggregation, to the network. The user terminal may report combinations of bands that can be allocated to different cell groups, component carriers that can be given PUCCHs (capability), and the like to the network.

The network transmits information on component carriers to undergo downlink carrier aggregation or uplink carrier aggregation, cell group allocation, and a component carrier to be given a PUCCH in each cell group, to the user terminal by upper layer signaling.

The user terminal initiates communication by extended carrier aggregation based on the received information and feedbacks uplink control information (UCI) using the mechanism of existing LTE with up to five component carries in each cell group.

Figure 5A:
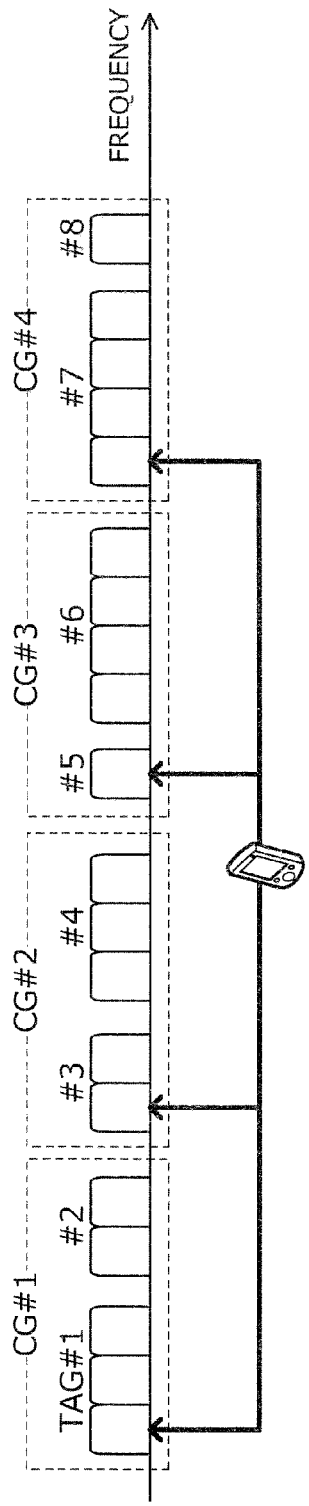
FIG. 5 is a diagram for explaining an example of extended carrier aggregation according to the first embodiment.

According to LTE Rel.11, up to four TAGs can be set. However, with extended carrier aggregation, the maximum number of assignable TAGs may be increased as the number of component carriers increases. For example, eight TAGs may be allocated as shown in FIG. 5A.

Figure 5B:
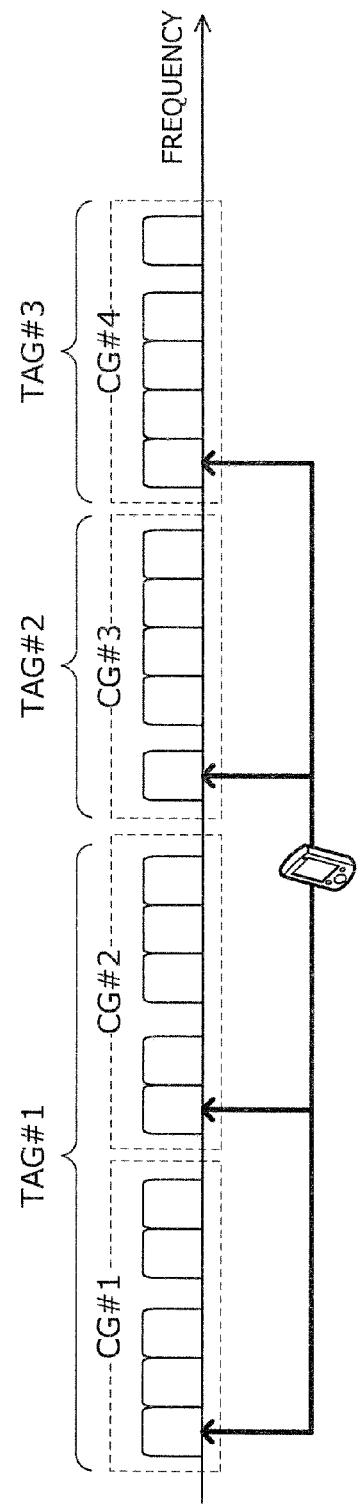

In general, a plurality of TAGs is allocated when radio base stations with which the user terminal communicates use different transmission/reception points. For this reason, in actuality, a large number of (e.g., eight) TAGs are rarely required; thus, existing specifications can probably support an adequate number of TAGs. The number of TAGs may therefore be limited to below a certain level, unlike the number of component carriers and cell groups. For example, as shown in FIG. 5B, a plurality of cell groups may be contained in the same TAG. In this case, the number of component carriers to undergo carrier aggregation can be increased without increasing the number of TAGs whose timing should be separately controlled by the user terminal, thereby improving the peak communication data rate while suppressing increases in the cost of the user terminal and the consumption of battery.

Second Embodiment

In the second embodiment, extended carrier aggregation uses Single-PUCCHs defined by existing carrier aggregation.

As described above, an existing PUCCH can only transmit HARQ-ACK of up to five component carriers. In use of extended carrier aggregation, to solve the problem of an excess number of ACK/NACK (A/N) bits that can be multiplexed into a single PUCCH, a plurality of component carriers may be collected into one group in which A/N is bundled (bundling).

Figure 6:
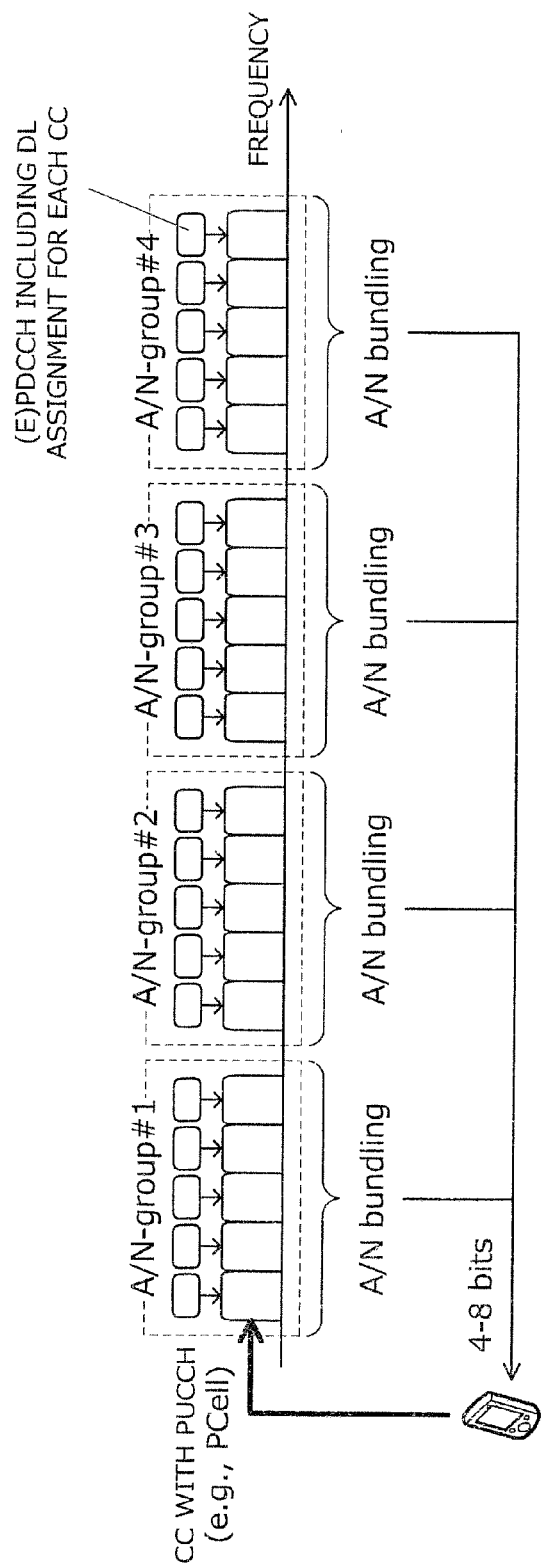
FIG. 6 is a diagram for explaining an example of extended carrier aggregation according to the second embodiment.

In the case shown in FIG. 6, 20 component carriers to undergo extended carrier aggregation are grouped into A/N groups #1 to #4. An A/N group corresponds to a TAG or cell group. This means that the user terminal may regard a TAG or cell group as an A/N group. The component carriers in an A/N group receive a PDCCH or enhanced PDCCH (EPDCCH) containing downlink assignment information (DL assignment) on the respective component carriers, and acknowledgement (ACK) or negative-acknowledgement (HACK) indicating the results are bundled group by group. The user terminal transmits UCI (A/N bundling) by using the PUCCH resource of a PCell. In the case shown in FIG. 6, the A/N bit count is four. In use of multiple-input and multiple-output (MIMO) for each component carrier, to transmit/receive double data, for example, the maximum A/N bit count is eight.

In this case, however, upon an error of reception of downlink assignment information on any component carrier in an A/N group, although not properly receiving downlink data assigned to the component carrier of the A/N group, the user terminal may determine that the result is acknowledgement (ACK) because it cannot even check the presence of data. To solve this problem, a radio base station may transmit downlink assignment information not to individual component carriers but to individual A/N groups (or TAGs or cell groups). To be specific, downlink control information (DL assignment) and uplink control information (HARQ-ACK) may be transmitted to individual A/N groups. Upon detection of downlink assignment information, the user terminal bundles A/N of all assignments and if no downlink assignment information is detected, all assignments are discontinuous transmission (DTX).

Figure 7:
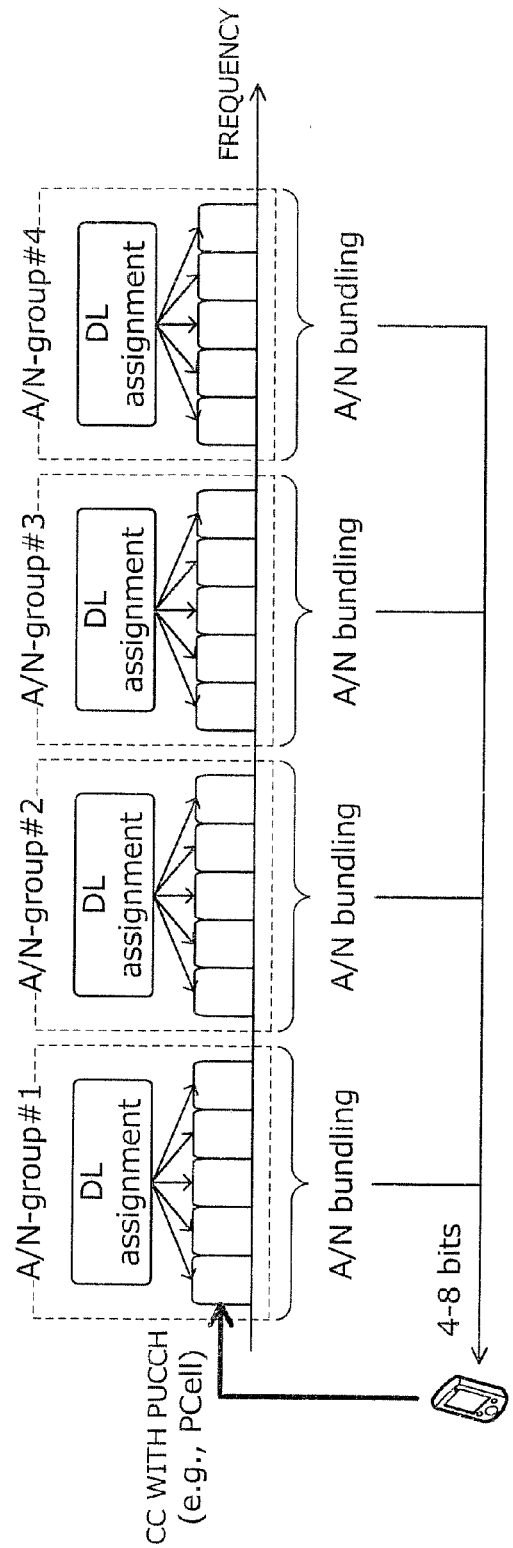
FIG. 7 is a diagram for explaining an example of extended carrier aggregation according to the second embodiment.

In the case shown in FIG. 7, 20 component carriers to undergo extended carrier aggregation are grouped into A/N groups #1 to #4, and downlink assignment and A/N bundling (bundling) are performed for each group. Downlink assignment information (DL assignment) is transmitted to one in an A/N group or a plurality of component carriers. The user terminal may decode downlink assignment information on one or more component carriers by blind detection and component carriers through which transmission is performed may be pre-specified by, for example, upper layer signaling.

A user terminal performs blind detection on multiple blocks of downlink assignment information and determines which cyclic redundancy check (CRC)-checked blocks become downlink assignment information that is allocated to that user terminal. This downlink assignment information includes information on assignment to multiple component carriers. This information specifies component carriers assigned with data and includes link adaptation information (e.g., frequency resource, the number of MIMO ranks, modulation and coding scheme (MCS) level, and transport block (TB) size) concerning each component carrier assigned with data. Link adaptation information may be common to, or different between, the component carriers in the same group. As common information increases, overhead decreases. Greater numbers of different blocks of information result in more detailed link adaptation, leading to an improvement in throughput.

Figure 8:
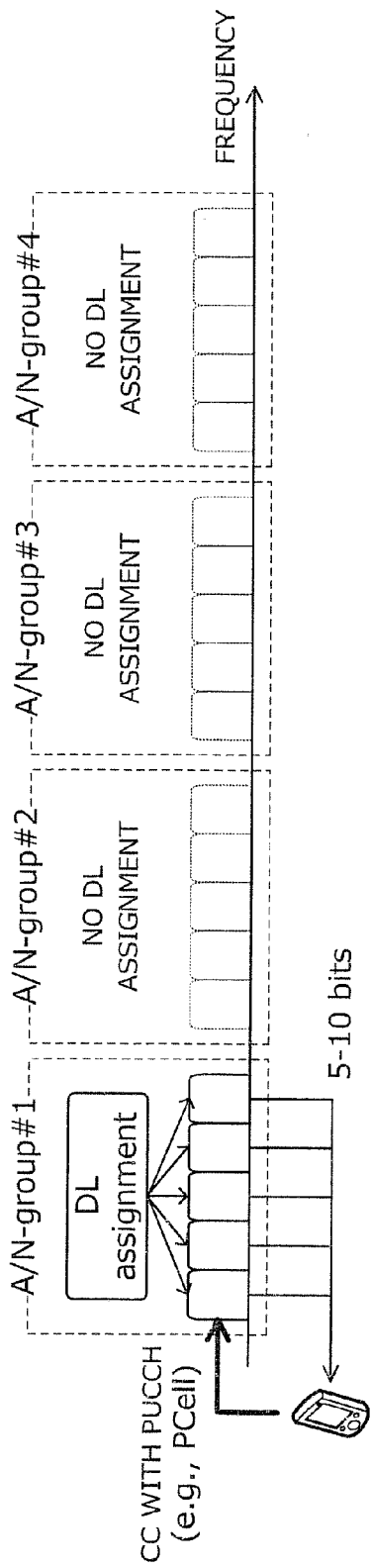
FIG. 8 is a diagram for explaining an example of extended carrier aggregation according to the second embodiment.

It should be noted that as shown in FIG. 8, if there is only ACK/NACK for the component carriers in one A/N group, a fallback to Rel.10/11 carrier aggregation may be carried out. To be specific, when only the component carriers in one A/N group detect downlink assignment information, the user terminal may transmit A/N for the CCs in the A/N group without bundling.

Alternatively, when the user terminal detects a PDCCH indicating assignment information for one component carrier, a fallback to Rel.10/11 carrier aggregation may be carried out. The user terminal performs blind detection of both a PDCCH indicating assignment information for one component carrier and a PDCCH containing assignment information for a plurality of A/N-grouping-applied component carriers. In addition, upon detection of a PDCCH indicating assignment information for one component carrier, the user terminal may transmit A/N without bundling.

The PUCCH resource and PUCCH format may be changed between conventional carrier aggregation, which supports up to five component carriers, and extended carrier aggregation, which supports more than five component carriers. To be specific, different PUCCH resources and PUCCH formats may be used to transmit PUCCHs, depending on whether or not A/N bundling is used.

Figure 9A:
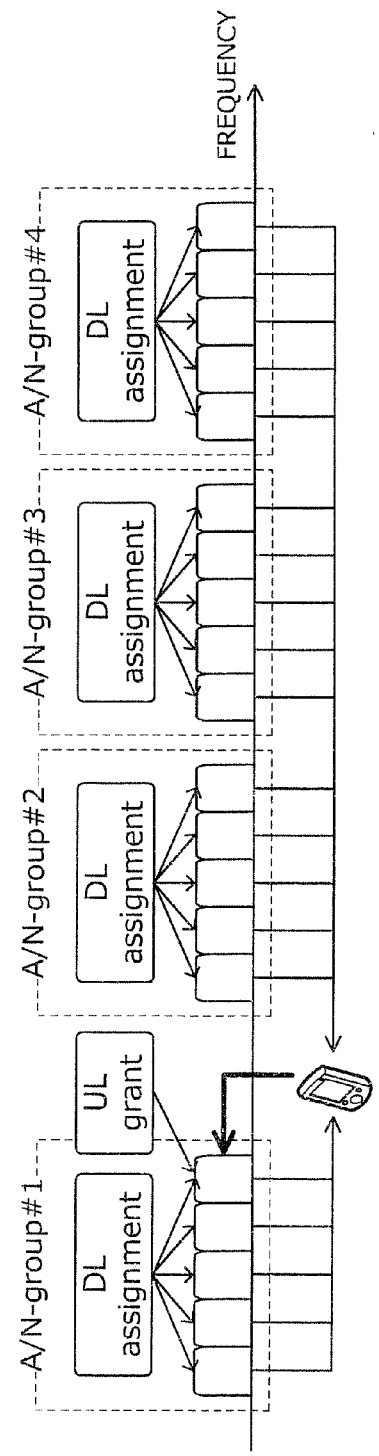
FIG. 9 is a diagram for explaining an example of extended carrier aggregation according to the second embodiment.
Figure 9B:
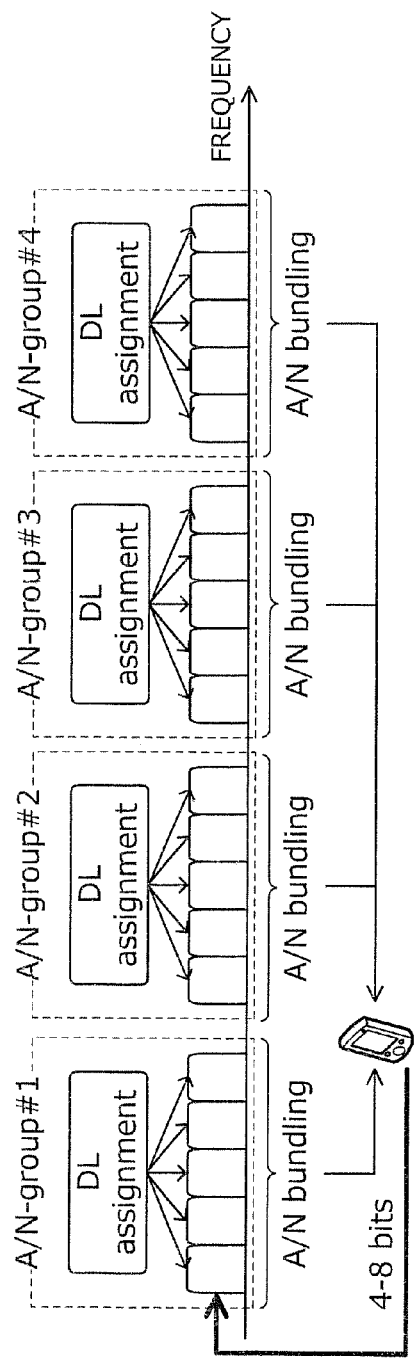

As shown in FIG. 9A, when a PUSCH is assigned to a given target component carrier, the user terminal may transmit UCI (ACK/NACK) by using a PUSCH resource without A/N bundling. This is because a PUSCH, which has large capacity that can contain a large number of bits, does not need compression by A/N bundling. In this case, the A/N bit count is 20 to 40. As shown in FIG. 9B, when no component carrier is assigned with a PUSCH, the user terminal may perform A/N bundling and transmit UCI (A/N bundling) using a PUCCH resource.

Third Embodiment

In the third embodiment, a method will be described of deactivating unnecessary component carriers when there is no traffic during extended carrier aggregation.

Figure 10A:
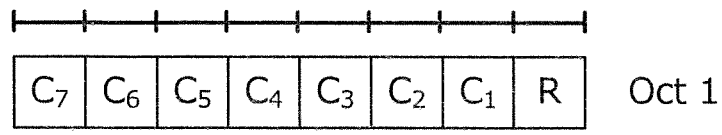
FIG. 10 is a diagram for explaining MAC CE for controlling activation/deactivation according to the third embodiment.

With extended carrier aggregation, carrier aggregation of a large number of component carriers achieves high peak rates but increases power consumption. It is therefore important to deactivate unnecessary component carriers (de-activation) when there is no traffic. With existing LTE, however, a MAC control element (MAC CE) instructing activation/deactivation has only seven bits (see FIG. 10A). To be specific, activation/deactivation instructions are made with only seven cells.

To solve this problem, activation/deactivation instructions may be made for individual groups of cells, such as TAGs, cell groups, or A/N groups. In this case, $C_i$ in the MAC CE shown in FIG. 10A may be regarded as representing an activation/deactivation command for a cell group called SCell group index i. Notification of the SCell group index is notified via an upper layer.

In a conventional scheme based on SCell index i, PCells and PSCells under dual connectivity are not deactivated. Accordingly, the MAC CE does not include $C_i$ (=SCell index i) corresponding to a PCell. Therefore, if the conventional scheme based on SCell index i is replaced with a scheme based on SCell group index i, an activation/deactivation command cannot be transmitted to the cell group including the PCell. Consequently, the cell group including the PCell is always active (see FIG. 11A).

Figures 11A, 11B:
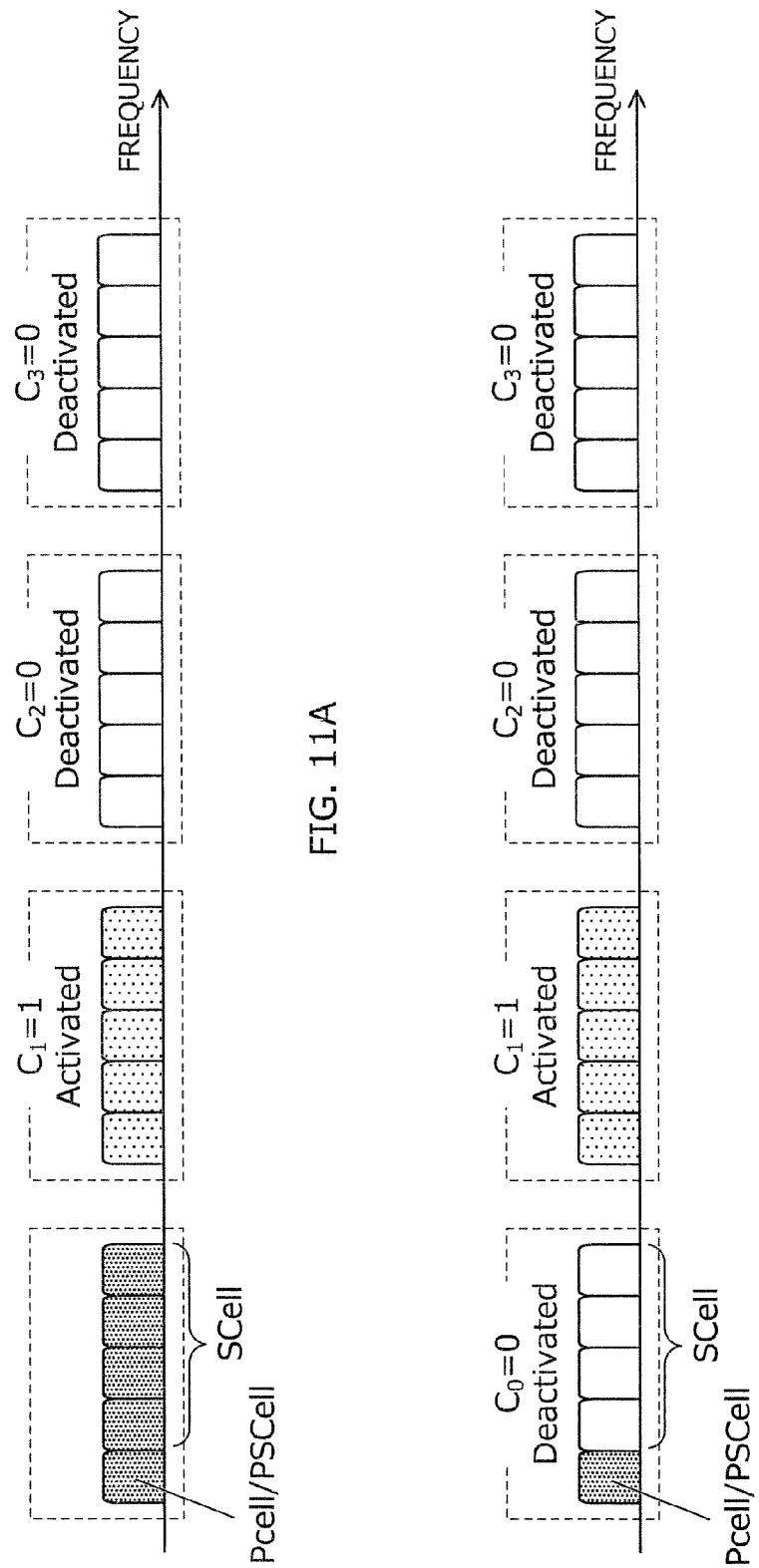
FIG. 11 is a diagram for explaining activation/deactivation of a cell group according to the third embodiment.

However, in order to suppress power consumption while there is no traffic, it is preferable that deactivation of SCells be possible even in the cell group including the PCell. Accordingly, the third embodiment may allow an activation/deactivation command to be transmitted to a cell group including a PCell or PSCell. Upon reception of an instruction to deactivate the cell group including a PCell or PSCell, the user terminal may deactivate only the SCells in the cell group (see FIG. 11B). As shown in FIG. 11B, the PCell or PSCell is always kept active independently of a command.

It should be noted that in addition to activation/deactivation of individual cell groups, group-by-group deactivation timer management may be carried out. Upon selection of the cell group, the user terminal performs total management, including deactivation timer control, on a group basis, although it is traditionally carried out on a component carrier basis. This facilitates implementation of the user terminal.

Figure 10B:
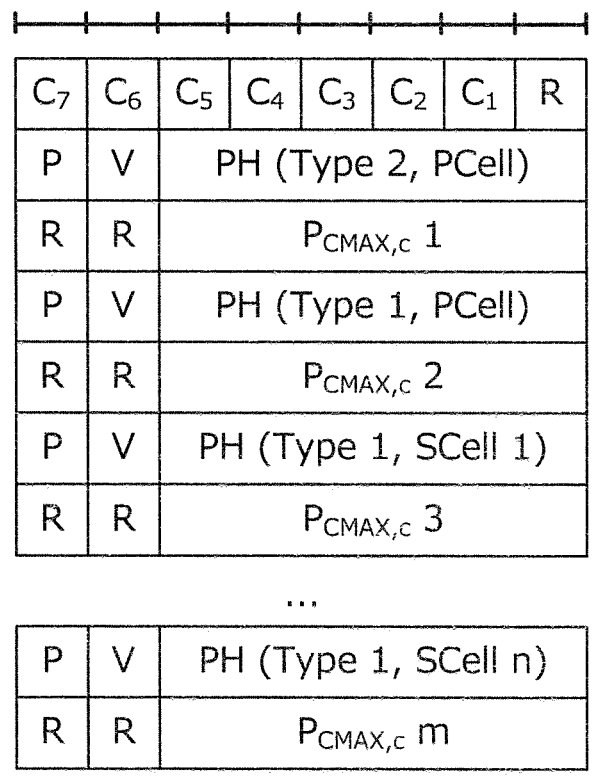

In existing LTE, a MAC CE, which provides a power headroom report (PHR), reports activated/deactivated cells (see FIG. 10B). In particular, a MAC CE, which provides a PHR, reports activated/deactivated cells and the maximum transmission power $P_{CMAx,c}$ and PHR for each activated cell. For $C_0$, which does not exist in an existing PHR MAC CE, a new line may be added to extend the MAC CE so that up to 16 activated/deactivated cells can be reported, or the reserved bit (R) may be set to 0 or 1.

In the third embodiment, $C_i$ reported by the PHR MAC CE may be regarded as a group index i. With $C_i$, activated groups and maximum transmission power $P_{CMAX,c}$ and transmission power headroom PHR for active component carriers may be reported. PHR timer and the like may also be managed on a group basis.

Alternatively, in addition to group-by-group activation/deactivation, group-by-group PHR may be used. The user terminal may report, through $C_i$ activated groups and maximum allowable power (e.g. $P_{CMAX,g}$) and PHR for the individual activated groups. PHR for each group is determined by subtracting the total assignment power in the group from $P_{CMAX,g}$.

(Configuration of Radio Communication System)

The configuration of a radio communication system according to this embodiment will now be described. This radio communication system employs a radio communication method in which uplink transmission operation for LAA is performed in unlicensed bands.

Figure 12:
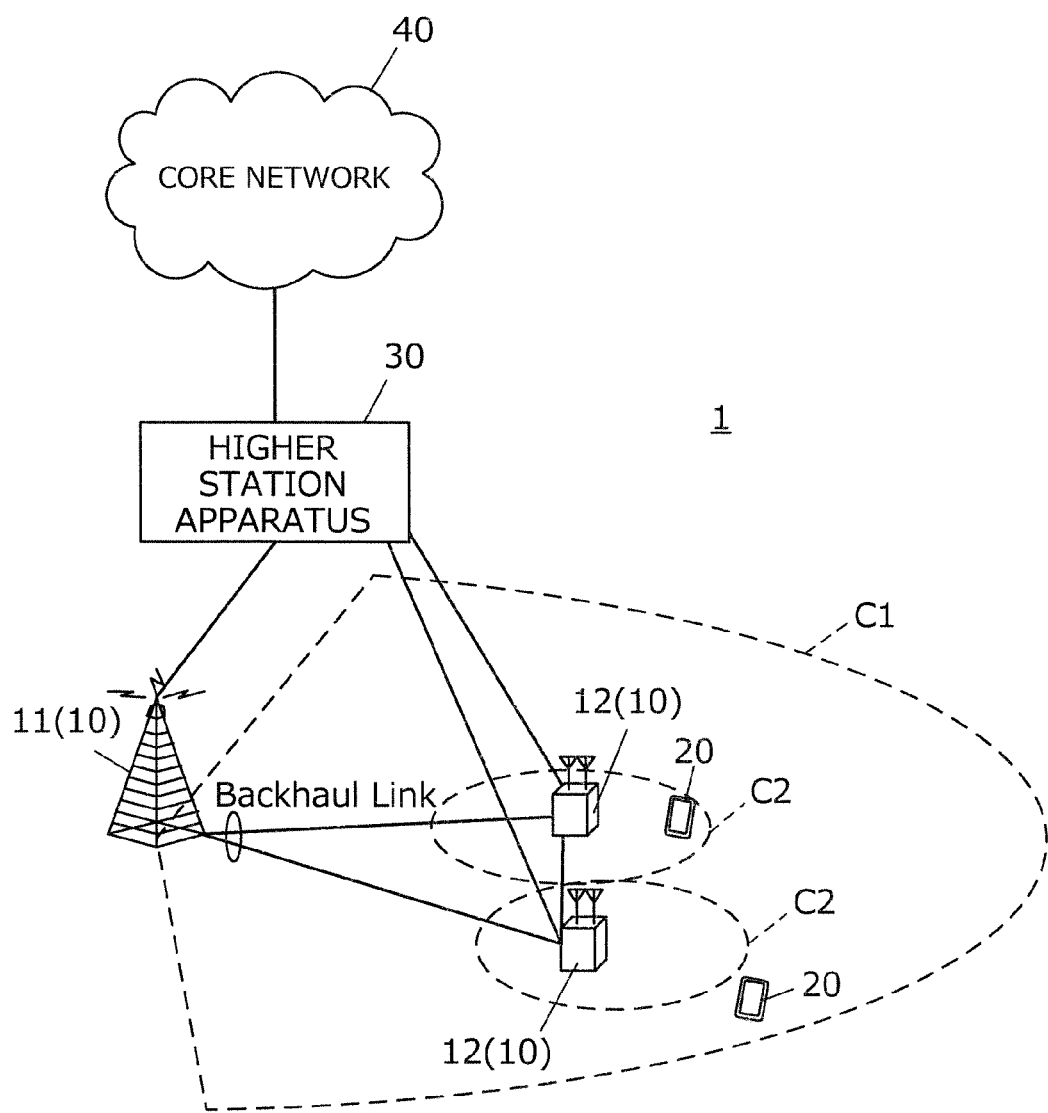
FIG. 12 is a diagram showing an example schematic configuration of a radio communication system according to this embodiment.

FIG. 12 is a diagram showing an example schematic configuration of a radio communication system according to this embodiment. This radio communication system can employ one or both of dual connectivity and carrier aggregation that unites a plurality of basic frequency blocks (component carriers) using a system band width for an LTE system as one unit. Moreover, this radio communication system includes radio base stations that can use unlicensed bands.

As shown in FIG. 12, a radio communication system 1 includes a plurality of radio base stations 10 (11 and 12) and a plurality of user terminals 20 in cells formed by the radio base stations 10 and configured to communicate with the radio base stations 10. The radio base stations 10 are connected to a higher station apparatus 30 and to a core network 40 via the higher station apparatus 30.

Referring to FIG. 12, the radio base station 11 is a macro base station with relatively high coverage, forming a macro cell C1. The radio base stations 12 are small base stations with low coverage, forming small cells C2. It should be noted that the number of the radio base stations 11 and 12 is not limited that in FIG. 12.

For example, the macro cell C1 may be operated in a licensed band, and the small cells C2 in an unlicensed band. Alternatively, part of the small cells C2 may be operated in an unlicensed band, and the rest of the small cells C2 in a licensed band. The radio base stations 11 and 12 are connected to each other via an inter-base station interface (e.g., optical fiber and X2 interface).

The user terminal 20 can be connected to both the radio base station 11 and the radio base station 12. The user terminal 20 is assumed to concurrently use the macro cell C1 and the small cell C2, which use different frequencies, by carrier aggregation or dual connectivity. For example, the radio base station 11 using a licensed band can transmit the user terminal 20 assistance information (e.g., downlink signal configuration) on the radio base station 12 which uses an unlicensed band. To achieve carrier aggregation between a licensed band and an unlicensed band, one radio base station (e.g., the radio base station 11) may control the schedules of licensed band cells and unlicensed band cells.

The user terminal 20 may be connected not to the radio base station 11 but to the radio base station 12. For example, the radio base station 12 using an unlicensed band may be connected to the user terminal 20 in a standalone manner. In this case, the radio base station 12 controls the schedules of unlicensed band cells.

Examples of the higher station apparatus 30 include, but should not be limited to, access gateway devices, wireless network controllers (RNCs), and mobility management entities (MMEs).

Examples of the downlink channels used in the radio communication system 1 include physical downlink shared channels (PDSCHs) shared among user terminals 20, downlink control channels (physical downlink control channels (PDCCHs) and enhanced physical downlink control channels (EPDCCHs)), and physical broadcast channels (PBCHs). User data, upper layer control information, and predetermined system information blocks (SIBs) are transmitted through PDSCHs. Downlink control information (DCI) is transmitted through PDCCHs or EPDCCHs.

Examples of the uplink channels used in the radio communication system 1 include physical uplink shared channels (PUSCHs) shared among the user terminals 20 and physical uplink control channels (PUCCHs). User data and upper layer control information are transmitted through PUSCHs.

Figure 13:
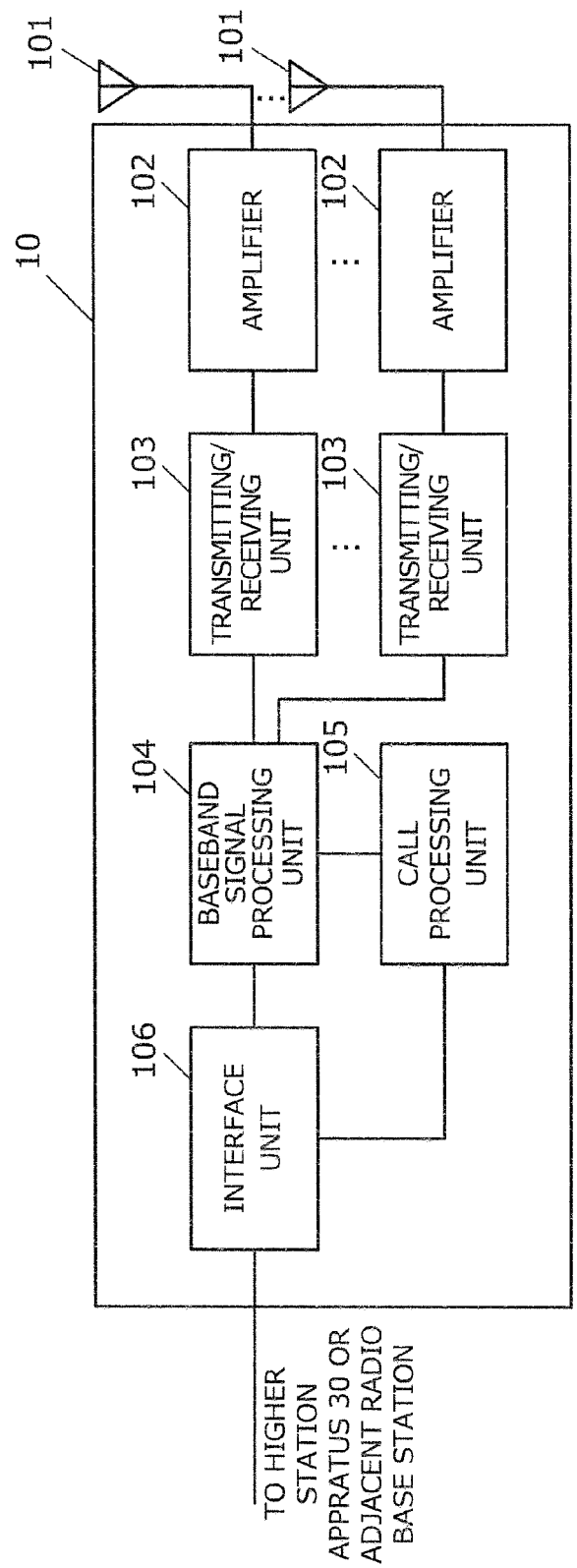
FIG. 13 is a diagram showing an example overall configuration of a radio base station according to this embodiment.

FIG. 13 is a diagram showing an overall configuration of the radio base station 10 according to this embodiment. As shown in FIG. 13, the radio base station 10 includes a plurality of transmitting/receiving antennas 101 for multiple-input and multiple-output (MIMO) transmission, amplifiers 102, transmitting/receiving units (transmitting units and receiving units) 103, a baseband signal processing unit 104, a call processing unit 105, and an interface unit 106.

User data transmitted from the radio base station 10 to the user terminals 20 through the downlink channel is input from the higher station apparatus 30 to the baseband signal processing unit 104 through the interface unit 106.

The baseband signal processing unit 104 performs packet data convergence protocol (PDCP) layer processing, user data division/combination, transmission processing for an RLC layer, such as transmission processing for radio link control (RLC) retransmission control, medium access control (MAC) retransmission control, such as transmission processing, scheduling, transmission format selection, channel coding, inverse fast Fourier transform (IFFT) processing, and pre-coding for hybrid automatic repeat request (HARQ), and transfers the results to each transmitting/receiving unit 103. Downlink control signals are also subjected to transmission processing, such as channel coding and inverse fast Fourier transform, and the results are transferred to each transmitting/receiving unit 103.

Each transmitting/receiving unit 103 converts a downlink signal, which is pre-coded for the corresponding antenna and output from the baseband signal processing unit 104, to a wireless-frequency signal. Each amplifier 102 amplifies the wireless-frequency signal generated by frequency conversion and transmits it through the corresponding transmitting/receiving antenna 101. Each transmitting/receiving unit 103 is a transmitter/receiver, a transmitting/receiving circuit, or a transmitting/receiving device based on common understanding within the technical field of the present invention.

The transmitting/receiving unit 103 transmits information on six or more component carriers configured to a user terminal 20 and receives ACK/NACK information fed back from one of the component carriers in each cell group.

As for uplink signals, a wireless-frequency signal received at each transmitting/receiving antenna 101 is amplified by the corresponding amplifier 102, frequency-converted in the corresponding transmitting/receiving unit 103 for conversion to a baseband signal, and then input to the baseband signal processing unit 104.

In the baseband signal processing unit 104, user data in the received uplink signal is subjected to fast Fourier transform (FFT) processing, inverse discrete Fourier transform (IDFT) processing, error correction decoding, reception processing for MAC retransmission control, and reception processing for RLC layers and PDCP layers, and then transferred to the higher station apparatus 30 through the interface unit 106. The call processing unit 105 performs call processing, such as communication channel allocation and release, management of the radio base station 10, and management of the wireless resource.

The interface unit 106 transmits/receives signals (backhaul signaling) to/from the adjacent radio base station through an inter-BS interface (e.g., optical fiber and X2 interface). Alternatively, the interface unit 106 transmits/receives signals to/from the higher station apparatus 30 through a predetermined interface.

Figure 14:
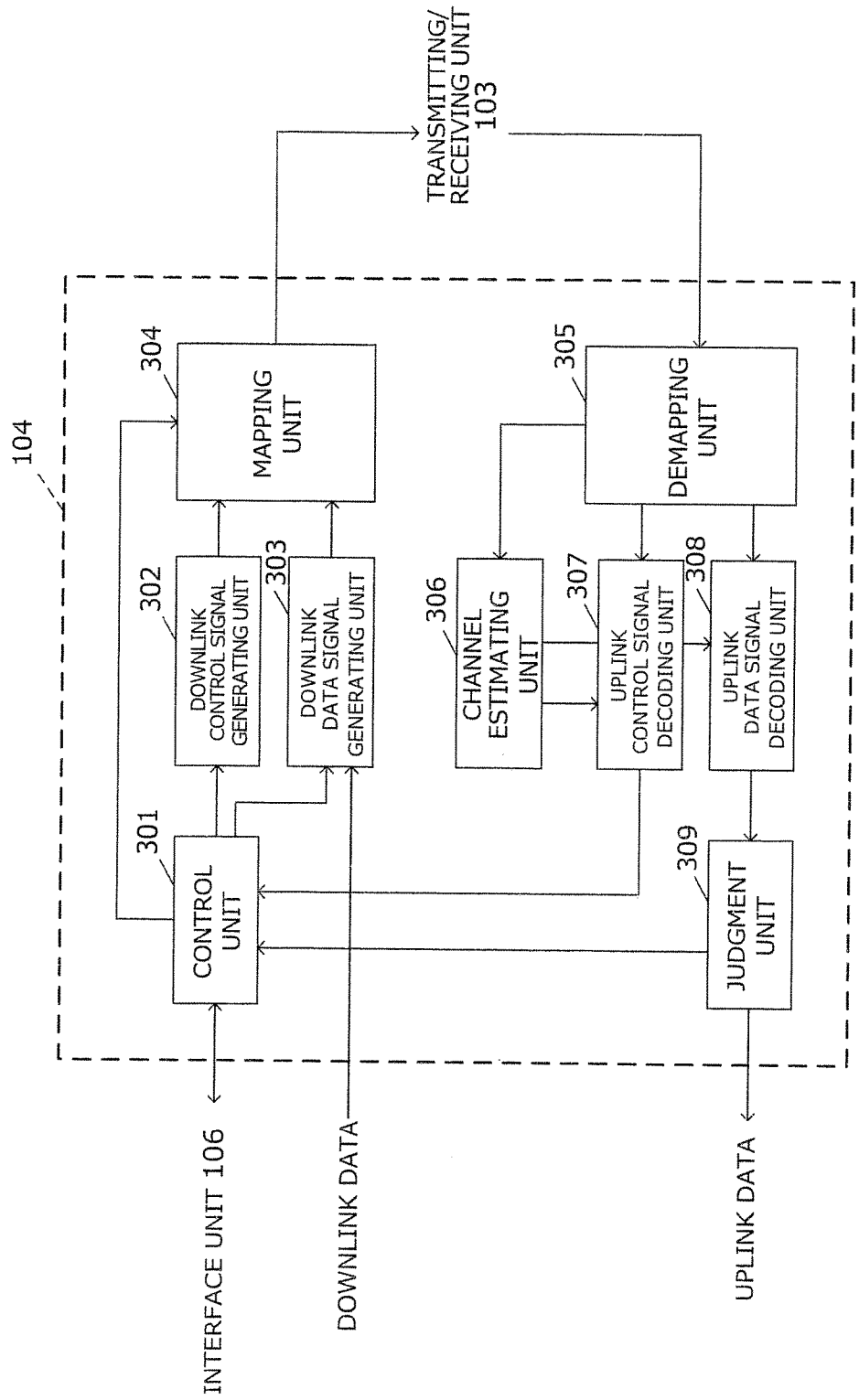
FIG. 14 is a diagram showing an example functional configuration of a radio base station according to this embodiment.

FIG. 14 is a diagram showing a main functional configuration of the baseband signal processing unit 104 included in the radio base station 10 according to this embodiment. As shown in FIG. 14, the baseband signal processing unit 104 included in the radio base station 10 includes at least a control unit 301, a downlink control signal generating unit 302, a downlink data signal generating unit 303, a mapping unit 304, a demapping unit 305, a channel estimating unit 306, an uplink control signal decoding unit 307, an uplink data signal decoding unit 308, and a judgment unit 309.

The control unit 301 controls scheduling for downlink user data transmitted through a PDSCH, downlink control information transmitted through one or both of a PDCCH and an extended PDCCH (EPDCCH), downlink reference signals, and the like. Further, the control unit 301 controls scheduling (assignment control) for RA preambles transmitted through a PRACH, unlink data transmitted through a PUCCH, uplink control information transmitted through a PUCCH or PUCCH, and uplink reference signals. Information on assignment control of uplink signals (uplink control signals and uplink user data) is transmitted to user terminals 20 with the use of downlink control signals (DCI).

The control unit 301 controls assignment of wireless resources to downlink signals and uplink signals in accordance with instructions from the higher station apparatus 30 and feedback information from the user terminals 20. Thus, the control unit 301 serves as a scheduler. The control unit 301 is a controller, a control circuit, or a control device based on common understanding within the technical field of the present invention.

The downlink control signal generating unit 302 generates downlink control signals (one or both of PDCCH signals and EPDCCH signals) which are assigned by the control unit 301. To be specific, the downlink control signal generating unit 302 generates, in accordance with instructions from the control unit 301, downlink assignment that provides assignment information on downlink signals, and uplink grants that provide assignment information on uplink signals. The downlink control signal generating unit 302 is a signal generator or a signal generating circuit based on common understanding within the technical field of the present invention.

The downlink data signal generating unit 303 generates downlink data signals (PDSCH signals) assigned to resources by the control unit 301. Data signals generated by the downlink data signal generating unit 303 are coded and modulated according to coding rates and modulation methods determined by CSI and the like sent from the user terminals 20.

The mapping unit 304 controls assignment of downlink control signals generated in the downlink control signal generating unit 302 and downlink data signals generated in the downlink data signal generating unit 303 to wireless resources in accordance with instructions from the control unit 301. The mapping unit 304 is a mapping circuit or a mapper based on common understanding within the technical field of the present invention.

The demapping unit 305 performs demapping on uplink signals transmitted from the user terminals 20, thereby dividing the uplink signals. The channel estimating unit 306 estimates the channel state from reference signals included in the received signals resulting from division performed by the demapping unit 305, and feeds the estimated channel state to the uplink control signal decoding unit 307 and the uplink data signal decoding unit 308.

The uplink control signal decoding unit 307 decodes feedback signals (e.g., arrival confirmation signals) transmitted from the user terminals through uplink control channels (PRACHs, PUCCHs), and feeds the results to the control unit 301. The uplink data signal decoding unit 308 decodes uplink data signals transmitted from the user terminals through physical uplink shared channels (PUSCHs), and feeds the results to the judgment unit 309. The judgment unit 309 performs retransmission control judgement (A/N judgement) based on decoding results given by the uplink data signal decoding unit 308 and feeds the results to the control unit 301.

Figure 15:
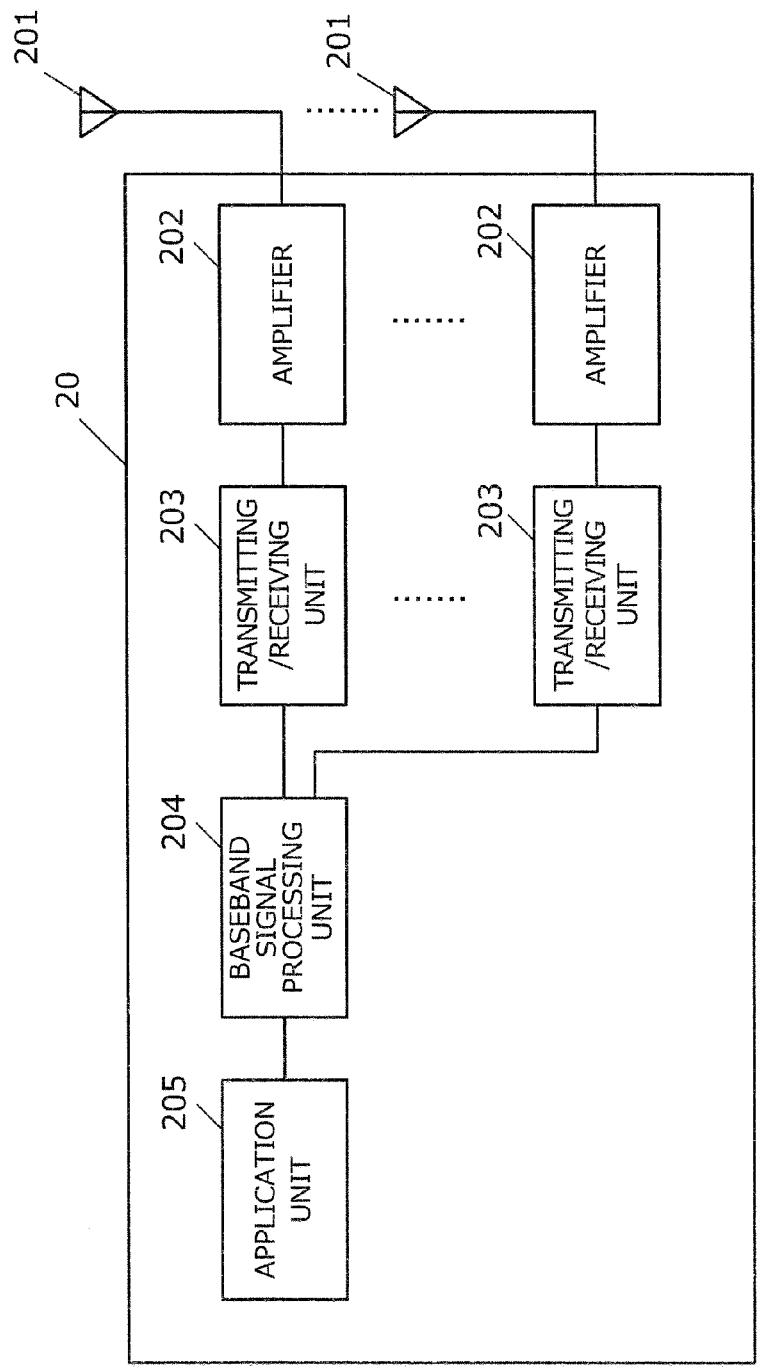
FIG. 15 is a diagram showing an example overall configuration of a user terminal according to this embodiment.

FIG. 15 is a diagram showing an overall configuration of the user terminal 20 according to this embodiment. As shown in FIG. 15, the user terminal 20 includes a plurality of transmitting/receiving antennas 201 for MIMO transmission, amplifiers 202, transmitting/receiving units (transmitting units and receiving units) 203, a baseband signal processing unit 204, and an application unit 205.

For downlink data, wireless-frequency signals received at a plurality of transmitting/receiving antennas 201 are amplified by the respective amplifiers 202, frequency-converted in the respective transmitting/receiving units 203 for conversion to baseband signals. These baseband signals are subjected to FFT processing, error correction decoding, retransmission control reception processing, and the like in the baseband signal processing unit 204. Downlink user data in this downlink data is transferred to the application unit 205. The application unit 205 performs processing related to layers upper than physical layers and MAC layers. System information in the downlink data is also transferred to the application unit 205. Each transmitting/receiving unit 203 is a transmitter/receiver, a transmitting/receiving circuit, or a transmitting/receiving device based on common understanding within the technical field of the present invention.

Meanwhile, uplink user data is input from the application unit 205 to the baseband signal processing unit 204. The baseband signal processing unit 204 performs retransmission control (HARQ) transmission processing, channel coding, pre-coding, discrete Fourier transform (DFT) processing, inverse fast Fourier transform (IFFT) processing, and the like, and the results are transferred to each transmitting/receiving unit 203. Each transmitting/receiving unit 203 converts a baseband signal, which is output from the base band signal processing unit 204, to a wireless-frequency signal. Subsequently, each amplifier 202 amplifies the frequency-converted wireless-frequency signal which is then transmitted through the corresponding transmitting/receiving antenna 201.

The transmitting/receiving unit 203 receives information on a plurality of component carriers configured by the radio base station 10 and feedbacks ACK/NACK information to one of the component carriers in each cell group.

Figure 16:
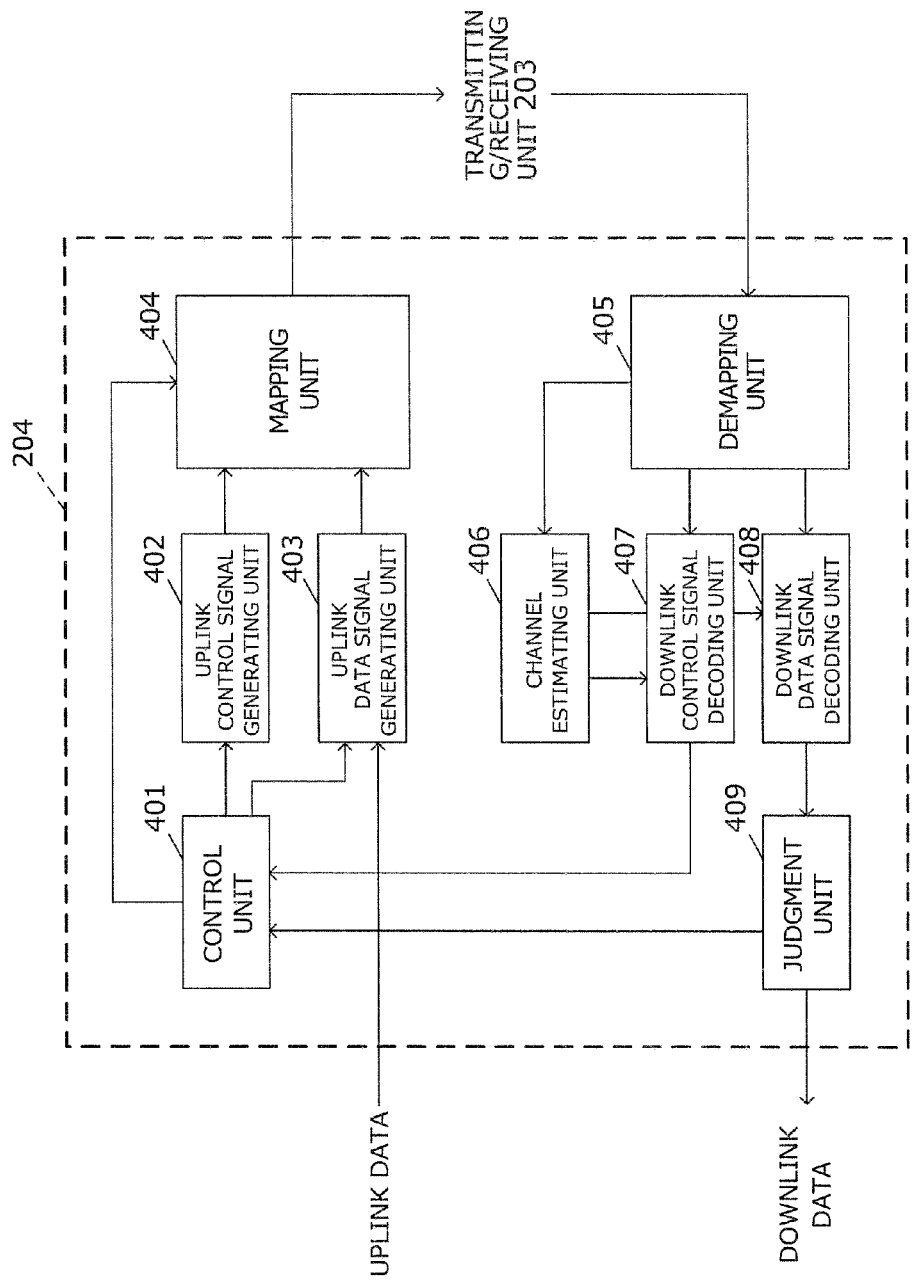
FIG. 16 is a diagram showing an example functional configuration of a user terminal according to this embodiment.

FIG. 16 is a diagram showing a main functional configuration of the baseband signal processing unit 204 included in the user terminal 20. As shown in FIG. 16, the baseband signal processing unit 204 included in the user terminal 20 includes at least a control unit 401, an uplink control signal generating unit 402, an uplink data signal generating unit 403, a mapping unit 404, a demapping unit 405, a channel estimating unit 406, a downlink control signal decoding unit 407, a downlink data signal decoding unit 408, and a judgment unit 409.

The control unit 401 controls generation of uplink control signals (e.g., A/N signals) and uplink data signals on the basis of downlink control signals (PDCCH signals) transmitted from the radio base station 10 and the retransmission control judgement results for the received PDSCH signals. Downlink control signals received from the radio base station are output from the downlink control signal decoding unit 407, and the retransmission control judgement results are output from the judgment unit 409. The control unit 401 is a controller, a control circuit, or a control device based on common understanding within the technical field of the present invention.

The control unit 401 can control six or more component carriers configured by the radio base station 10.

The uplink control signal generating unit 402 generates uplink control signals (feedback signals such as arrival confirmation signals and channel state information (CSI)) in accordance with instructions from the control unit 401. The uplink data signal generating unit 403 generates uplink data signals in accordance with instructions from the control unit 401. It should be noted that the control unit 401 instructs the uplink data signal generating unit 403 to generate an uplink data signal when the downlink control signal received from the radio base station includes an uplink grant. The uplink control signal generating unit 402 is a signal generator or a signal generating circuit based on common understanding within the technical field of the present invention.

The mapping unit 404 controls assignment of uplink control signals (e.g., arrival confirmation signals) and uplink data signals to wireless resources (PUCCH, PUSCH) in accordance with instructions from the control unit 401.

The demapping unit 405 performs demapping on downlink signals transmitted from the radio base station 10 and divides the downlink signals. The channel estimating unit 406 estimates the channel state from reference signals contained in the received signals resulting from division performed by the demapping unit 405, and feeds the estimated channel state to the downlink control signal decoding unit 407 and the downlink data signal decoding unit 408.

The downlink control signal decoding unit 407 decodes downlink control signals (PDCCH signals) transmitted through physical downlink control channels (PDCCHs), and feeds scheduling information (information on assignment to uplink resources) to the control unit 401. It is also output to the control unit 401 when any downlink control signal includes information on a cell to feedback an arrival confirmation signal or information on the necessity of RF adjustment.

The downlink data signal decoding unit 408 decodes downlink data signals transmitted through physical downlink shared channels (PDSCHs) and feeds the results to the judgment unit 409. The judgment unit 409 performs retransmission control judgement (A/N judgement) based on the decoding results provided by the downlink data signal decoding unit 408, and feeds the judgement to the control unit 401.

It should be noted that the present invention is not limited to the above embodiments and various modifications can be made for its implementation. In the above embodiments, the sizes and shapes are not limited to those shown in the attached drawings and can be modified in various ways without departing from a range in which the advantageous effects of the present invention can be obtained. Aside from that, various modifications can be made without departing from the scope of the present invention.

This application claims priority to Japanese Patent Application No. 2014-226504 filed on Nov. 6, 2014 which is herein incorporated by reference.

The invention claimed is:

1. A user terminal comprising:
   a transmitter that transmits uplink control information (UCI) including at least one ACK/NACK bit by using a physical uplink control channel (PUCCH) or a physical uplink shared channel (PUSCH); and
   a processor that controls whether or not to bundle a plurality of ACK/NACK bits separately depending on whether the UCI is transmitted by using the PUCCH or the PUSCH,
   wherein when a plurality of cell groups is configured, the processor controls whether or not to bundle the plurality of ACK/NACK bits for each cell group.

2. The user terminal according to claim 1, wherein when a plurality of cell groups is configured, the transmitter transmits the UCI to a specific cell belonging to each cell group.

3. The user terminal according to claim 1, wherein when the UCI is transmitted by using the PUCCH, the processor bundles the plurality of ACK/NACK bits and when the UCI is transmitted by using the PUSCH, the processor cancels bundling the plurality of ACK/NACK bits.

4. The user terminal according to claim 2, wherein when the UCI is transmitted by using the PUCCH, the processor bundles the plurality of ACK/NACK bits and when the UCI is transmitted by using the PUSCH, the processor cancels bundling the plurality of ACK/NACK bits.

5. A radio base station comprising:
   a receiver that receives uplink control information (UCI) including at least one ACK/NACK bit by using a physical uplink control channel (PUCCH) or a physical uplink shared channel (PUSCH); and
   a processor that controls transmission of a physical downlink shared channel (PDSCH) based on the ACK/NACK bit,
   wherein whether or not to bundle a plurality of ACK/NACK bits is controlled separately depending on whether the UCI is received by using the PUCCH or the PUSCH, and
   wherein when a plurality of cell groups is configured, whether or not to bundle the plurality of ACK/NACK bits is controlled for each cell group.

6. A radio communication method for a user terminal comprising:
   transmitting uplink control information (UCI) including at least one ACK/NACK bit by using a physical uplink control channel (PUCCH) or a physical uplink shared channel (PUSCH); and
   controlling whether or not to bundle a plurality of ACK/NACK bits separately depending on whether the UCI is transmitted by using the PUCCH or the PUSCH,
   wherein when a plurality of cell groups is configured, whether or not to bundle the plurality of ACK/NACK bits is controlled for each cell group.

* * * * *